United States Patent
Brinson et al.

(10) Patent No.: US 11,203,949 B2
(45) Date of Patent: Dec. 21, 2021

(54) MECHANICALLY DRIVEN AIR VEHICLE THERMAL MANAGEMENT DEVICE

(71) Applicant: General Electric Company, Schenectady, NY (US)

(72) Inventors: Thomas Edward Brinson, Mason, OH (US); Paul Robert Gemin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 904 days.

(21) Appl. No.: 15/234,483

(22) Filed: Aug. 11, 2016

(65) Prior Publication Data

US 2018/0045068 A1    Feb. 15, 2018

(51) Int. Cl.
*F01D 15/00* (2006.01)
*F01D 15/12* (2006.01)
(Continued)

(52) U.S. Cl.
CPC .............. *F01D 15/12* (2013.01); *B64D 13/06* (2013.01); *B64D 27/10* (2013.01); *F01D 5/02* (2013.01);
(Continued)

(58) Field of Classification Search
CPC ...... F01D 15/12; F01D 13/003; F01D 13/006; F01D 13/02; B64D 13/06; B64D 13/08; B64D 2013/0618; B64D 2013/0648; B64D 2013/0644; B64D 2013/0696; F02C 7/36; F02C 7/275; F02C 3/13; F02C 3/107; F02C 3/113; F02C 7/32; F04D 29/5826; F25B 9/004; F25B 2309/004; F25B 2309/005;
(Continued)

(56) References Cited

U.S. PATENT DOCUMENTS 2,608,822 A   9/1952   Pavlecka et al.
3,965,673 A   6/1976   Friedrich
(Continued)

FOREIGN PATENT DOCUMENTS

GB    201611104    *   8/2016    ............. B64D 13/02

OTHER PUBLICATIONS

International Search Report and Written Opinion issued in connection with corresponding PCT Application No. PCT/US2017/040650 dated Apr. 26, 2018.

*Primary Examiner* — Edwin Kang (74) *Attorney, Agent, or Firm* — Dority & Manning, P.A.

(57) ABSTRACT

The present disclosure is directed to an aircraft power generation system including a reverse Brayton cycle system, a gas turbine engine, and a gearbox. The gas turbine engine includes a compressor section, a turbine section, and an engine shaft. The compressor section is arranged in serial flow arrangement with the turbine section. The engine shaft is rotatable with at least a portion of the compressor section and with at least a portion of the turbine section. The reverse Brayton cycle system includes a compressor, a driveshaft, a turbine, and a first exchanger. The driveshaft is rotatable with the compressor or the turbine, and the compressor, the first heat exchanger, and the turbine are in serial flow arrangement. The gearbox is configured to receive mechanical energy from the engine shaft and transmit mechanical energy to the reverse Brayton cycle system through the driveshaft.

7 Claims, 5 Drawing Sheets

(51) Int. Cl.

| | | |
|---|---|---|
| *F02C 7/32* | (2006.01) | |
| *F02C 7/12* | (2006.01) | |
| *F02C 7/36* | (2006.01) | |
| *B64D 13/06* | (2006.01) | |
| *B64D 27/10* | (2006.01) | |
| *F01D 5/02* | (2006.01) | |
| *F01D 11/24* | (2006.01) | |
| *F01D 13/00* | (2006.01) | |
| *F01D 13/02* | (2006.01) | |
| *F04D 29/32* | (2006.01) | |
| *F04D 29/58* | (2006.01) | |
| *F25B 9/00* | (2006.01) | |
| *F25B 9/10* | (2006.01) | |
| *F25B 9/14* | (2006.01) | |

(52) U.S. Cl.
 CPC ............ *F01D 11/24* (2013.01); *F01D 13/003* (2013.01); *F01D 13/006* (2013.01); *F01D 13/02* (2013.01); *F02C 7/12* (2013.01); *F02C 7/32* (2013.01); *F02C 7/36* (2013.01); *F04D 29/321* (2013.01); *F04D 29/5826* (2013.01); *F25B 9/004* (2013.01); *F25B 9/008* (2013.01); *F25B 9/10* (2013.01); *F25B 9/14* (2013.01); *B64D 2013/0618* (2013.01); *F05D 2220/323* (2013.01); *F05D 2240/24* (2013.01); *F05D 2240/60* (2013.01); *F05D 2260/213* (2013.01); *F05D 2260/40311* (2013.01); *F05D 2260/606* (2013.01); *F25B 2309/004* (2013.01); *F25B 2309/005* (2013.01); *Y02T 50/60* (2013.01)

(58) Field of Classification Search
 CPC ................. F25B 9/10; F05D 2260/213; F05D 2260/40311
 See application file for complete search history.

(56) References Cited

U.S. PATENT DOCUMENTS

| | | | | |
|---|---|---|---|---|
| 4,514,976 A | * | 5/1985 | Christoff | B64D 13/06 60/39.15 |
| 5,028,803 A | * | 7/1991 | Reynolds | F02N 11/04 290/31 |
| 5,136,837 A | | 8/1992 | Davison | |
| 5,363,641 A | | 11/1994 | Dixon et al. | |
| 5,860,283 A | | 1/1999 | Coleman et al. | |
| 5,967,461 A | * | 10/1999 | Farrington | B64D 13/06 244/118.5 |
| 8,522,572 B2 | | 9/2013 | Coffinbeny et al. | |
| 8,935,928 B2 | | 1/2015 | Mills | |
| 9,163,562 B2 | | 10/2015 | Suciu et al. | |
| 9,206,710 B2 | | 12/2015 | Gurin | |
| 2007/0089420 A1 | | 4/2007 | Klingels | |
| 2010/0126178 A1 | * | 5/2010 | Hyde | B64D 27/24 60/767 |
| 2012/0117982 A1 | * | 5/2012 | Suciu | F02C 7/32 60/802 |
| 2012/0247250 A1 | * | 10/2012 | Karafillis | F16H 57/0427 74/467 |
| 2013/0098067 A1 | | 4/2013 | Suciu et al. | |
| 2013/0192241 A1 | * | 8/2013 | Blackwell | F02C 9/16 60/772 |
| 2013/0192242 A1 | * | 8/2013 | Davis | F02C 3/113 60/772 |
| 2013/0294890 A1 | * | 11/2013 | Cepeda-Rizo | F04D 29/58 415/116 |
| 2014/0345281 A1 | | 11/2014 | Galbraith | |
| 2015/0001339 A1 | | 1/2015 | Gagne et al. | |
| 2015/0023776 A1 | * | 1/2015 | Ribarov | F01D 9/065 415/1 |
| 2015/0176497 A1 | * | 6/2015 | Schwarz | F02K 3/06 60/772 |
| 2015/0275769 A1 | * | 10/2015 | Foutch | F02C 9/18 60/776 |
| 2015/0308350 A1 | * | 10/2015 | Dobosz | F16H 1/222 415/124.1 |
| 2016/0167790 A1 | * | 6/2016 | Hipsky | F02C 7/32 74/15.4 |
| 2016/0281609 A1 | * | 9/2016 | Mitrovic | F02C 6/206 |
| 2016/0369705 A1 | * | 12/2016 | Mackin | F02C 6/08 |
| 2017/0248081 A1 | * | 8/2017 | Roach | F02C 7/36 |

\* cited by examiner

MECHANICALLY DRIVEN AIR VEHICLE THERMAL MANAGEMENT DEVICE

FIELD OF THE INFORMATION

The present invention relates generally to utilizing a gas turbine engine to power aircraft systems. More particularly, the present subject matter relates to a thermal management system that is mechanically driven by a gas turbine engine.

BACKGROUND OF THE INVENTION

Aircraft gas turbine engines deliver propulsive thrust for aircraft movement as well as provide energy for aircraft systems, such as a thermal management system (TMS), which may include an environmental control system (ECS). The TMS further includes management of energy and heat transfer among aircraft propulsion and electrical power generation units, fluid heat exchangers, electronics cooling, and an environmental control system (ECS), which provides conditioned air to an aircraft cabin, storage, and avionics. The ECS generally includes a reverse Brayton cycle system (RBC) that is pneumatically driven by compressed air that is diverted from the propulsive engines, as well as ducting and bleed ports to deliver compressed air from the propulsive engines to the RBC. Compressed air is diverted from either the low pressure (LP) or high pressure (HP) compressors, depending on the thrust setting of the engine. At a low thrust setting, compressed air is generally diverted from the HP compressors because the pressure would be too low to divert from the LP compressor. At a high thrust setting, compressed air is generally diverted from the LP compressors in order to lessen the deleterious effect of bleeding high pressure/high temperature air from the propulsive engine thermodynamic cycle. In some embodiments, compressed air is derived from the fan and is further energized for use with the ECS.

However, whether air is diverted from the fan, LP or the HP compressor, the air is generally at too high of pressure and temperature to be diverted to the RBC without further depressurization and cooling through a system of heat exchangers and pressure regulators before arriving at the RBC for use in the ECS. Therefore, a large amount of useful energy is wasted by powering an RBC using compressed air from the propulsive engines.

Additionally, diverting compressed air from the propulsive engines interrupts the thermodynamic cycle of the propulsive engines, thereby reducing their efficiency as energy from the compressed air is diverted away from the propulsive engines. Furthermore, the pressure regulators and heat exchangers, which are employed to remove energy from the compressed air before it reaches the RBC, add weight and complexity to the propulsive engines and aircraft, thereby further reducing the efficiency of the engines and aircraft.

Therefore, there exists a need to provide energy to the reverse Brayton cycle of the thermal management system while reducing the deleterious effects to the efficiency of the propulsive engines and aircraft.

BRIEF DESCRIPTION OF THE INVENTION

Aspects and advantages of the invention will be set forth in part in the following description, or may be obvious from the description, or may be learned through practice of the invention.

An aircraft power generation system including a reverse Brayton cycle system, a gas turbine engine, and a gearbox is generally provided. The gas turbine engine includes a compressor section, a turbine section, and an engine shaft. The compressor section is arranged in serial flow arrangement with the turbine section. The engine shaft is rotatable with at least a portion of the compressor section and with at least a portion of the turbine section. The reverse Brayton cycle system includes a compressor, a driveshaft, a turbine, and a first exchanger. The driveshaft is rotatable with the compressor or the turbine, and the compressor, the first heat exchanger, and the turbine are in serial flow arrangement. The gearbox is configured to receive mechanical energy from the engine shaft and transmit mechanical energy to the reverse Brayton cycle through the driveshaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A system of powering a reverse Brayton cycle (RBC) by mechanically coupling a shaft of a gas turbine engine to the reverse Brayton cycle by way of a gearbox is generally provided. The RBC is operated by mechanical energy from the gas turbine engine. A shaft of the engine (e.g. low pressure, intermediate pressure, or high pressure shaft) is mechanically coupled to the gearbox and transmits mechanical energy from the engine shaft to the gearbox. The gearbox outputs the mechanical energy from the engine shaft to the RBC through a driveshaft that is mechanically coupled and rotatable to the RBC. The gearbox outputs to the driveshaft the same, or proportional, or constant rotational speed relative to the engine shaft such that the RBC rotational speed operates closer to its optimum efficiency, operably independent of the engine thrust setting.

In a closed loop configuration, the RBC operates using any compressible fluid as the working fluid. The working fluid is in thermal communication with the air entering the ECS to achieve the desired temperature for the system. In an open loop configuration, the RBC derives outside air as the working fluid that ultimately becomes the conditioned air for the cabin, storage, and avionics.

In an open loop configuration, using mechanical energy to power the RBC rather than deriving energy pneumatically from compressed air from the engine may provide a working fluid at pressure and temperature conditions better suited for the thermal management system (TMS). The mechanical operation of the RBC allows the RBC to operate based on the requirements of the TMS rather than based on the outputs of the engine. Additionally, the RBC may be scaled in size to more precisely suit the needs of the TMS and other aircraft energy management systems, including systems such as the environmental control system (ECS), the turbine active clearance control (ACC), the aircraft anti-icing system, the nacelle anti-icing system, hydraulic and pneumatic pumps, fluid heat exchangers, and aircraft electronics and electrical systems.

Additionally, mechanically driving the RBC is more exergy-efficient than pneumatically driving the RBC using compressed air from the engine. Beyond analyzing energy efficiency, in which energy is the sum of useful energy (exergy) and waste energy (anergy), the RBC driven by mechanical energy from the engine shaft is more exergy efficient by limiting inefficiencies due to anergy increases due to thermodynamics and energy conversions. Thermodynamic losses result from removing exergy from the propulsive engines in the form of high pressure/high temperature compressed air. Additionally, thermodynamic losses result from the high-pressure and high-temperature of the compressed air being anergy that is processed through heat exchangers and pressure regulators into exergy to drive the RBC. By mechanically coupling the engine to the RBC, exergy, in the form of high pressure/high temperature compressed air in the engine, is preserved rather than being treated as anergy when used to drive the RBC.

Figure 1:
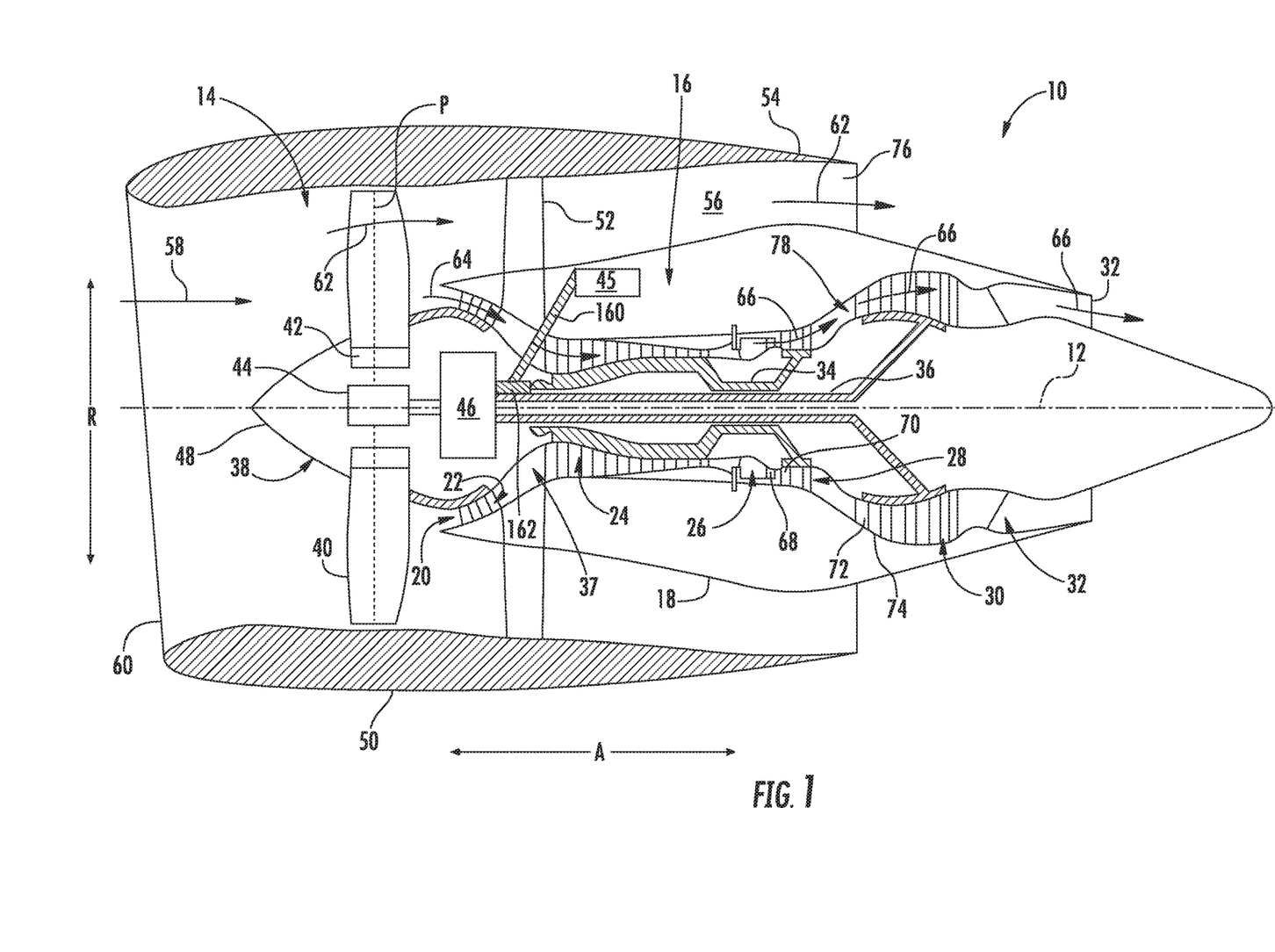
FIG. 1 is a schematic cross-sectional view of an exemplary gas turbine engine according to various embodiments of the present subject matter.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan engine 10, referred to herein as "turbofan engine 10." Although further described below generally with reference to the turbofan engine 10, the present disclosure is also applicable to turbomachinery in general, including turbojet, turboprop and turboshaft turbine engines, including industrial and marine turbine engines and auxiliary power units. As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 31 including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section 21, combustion section 26, turbine section 31, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gearbox 46. The power gearbox 46 includes a plurality of gears for adjusting the rotational speed of the fan 38 relative to the LP shaft 36 to a more efficient rotational fan speed.

The power gearbox 46 may include an epicyclical gear train that includes at least two gear types, in which a sun gear is in the center of the gear train and a planet gear is in epicyclical relationship to the sun gear. In other words, the center of at least one planet gear revolves around the center of the sun gear as the sun gear rotates on its fixed axis. The planet gears are supported by a carrier, which may aid in transferring torque from the sun gear to the planet gear. The planet gears are surrounded by a fixed annular gear, of which the teeth of the planet gear ride on the annular gear and sun gear. In other embodiments, a second planet gear set is placed radially between a first planet gear set and the annular gear. In another embodiment, the epicyclical gear train is of a star gear configuration, in which the center of each planet gear is fixed such that the planet gear rotates on a fixed axis relative to the sun gear. The surrounding annular gear rotates and transfers torque from the input power transferred to the sun gear. The carrier acts as a spacer between the sun gear and the planet gears and fixes the axis of each planet gear.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

A system of gears 162 is mechanically coupled to the HP shaft 34 and a towershaft 160 and transmits mechanical energy from the rotation of the HP shaft 34 through the towershaft 160 to at least one accessory gearbox (AGB) 45. Additionally, the gears 162 translate the direction of the transfer of mechanical energy, such as to an angle perpendicular or parallel to the centerline 12, or to an angle oblique to the centerline 12. An appropriate type of gear 162 may include a bevel gear (such as, but not limited to, Spiral, Zerol, Hypoid, or Mitre gears), screw gear, spur gear, ring gear, helical gear, or worm gear, or combinations thereof. The type of gear 162 employed depends on the angle of the towershaft 160 relative to the HP shaft 34 and the output speed and torque transmission from the engine shaft 35 to the towershaft 160. The towershaft 160 extends at an angle oblique to the HP shaft 34, or, in another embodiment, may extend substantially perpendicularly (in radial direction R) from the HP shaft 34. The towershaft 160 extends radially outward (in radial direction R) through a compressor intermediate case vane 103 in the core flowpath 37 and through the outer casing 18.

In one embodiment, the AGB 45 is positioned inside the outer casing 18 and includes gears that receive mechanical energy from the towershaft 160 and outputs mechanical energy to drive auxiliary equipment for the engine 10 and aircraft, such as fuel and oil pumps, hydraulic pumps, fluid coolers, electrical generators, and fuel and oil heat exchangers. In one embodiment, the AGB 45 is also mechanically coupled to a starter motor, which provides mechanical energy to initially drive the HP shaft 34 and rotate the HP compressor 24 to generate a sufficient air flow 64 before introducing fuel and igniting the fuel/air mixture in the combustion section 26. The resulting combustion gases 66 flow into the HP turbine 28, thus causing the HP shaft 34 to rotate, and thereby supporting operation of the gas turbine engine 10 as previously mentioned. In another embodiment, the AGB 45 is positioned radially outward (in direction R) of the outer casing 18 or radially outside of the fan case 50. In yet another embodiment, the AGB 45 is positioned on the aircraft wing or pylon.

Figure 2:
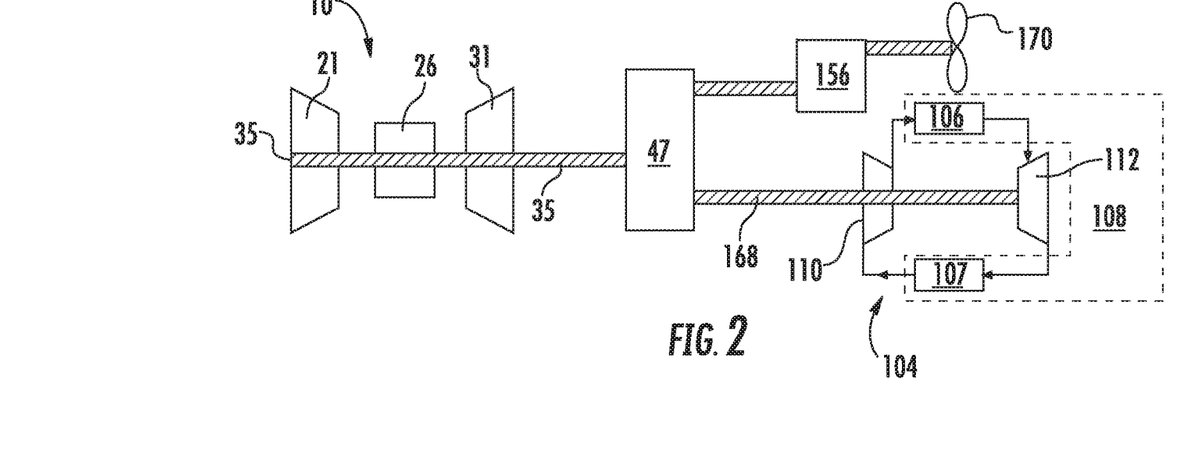
FIG. 2 is a schematic of an exemplary aircraft system including a gas turbine engine, a gearbox, a reverse Brayton cycle, an electrical powertrain, and a propulsion device.

FIG. 2 shows a schematic of an embodiment that includes the gas turbine engine 10, a gearbox 47, and a reverse Brayton cycle (RBC) system 104. The engine 10 includes the compressor section 21, the combustion section 26, and the turbine section 31 in serial flow arrangement. The engine 10 includes an engine shaft 35 rotatable with at least a portion of the compressor section 21 and with at least a portion of the turbine section 31. A portion of the compressor section 21 includes at least one compressor, e.g. the LP compressor 22, or the HP compressor 24, or an intermediate compressor. A portion of the turbine section 31 includes at least one turbine, e.g. the LP turbine 28, or the HP turbine 30, or an intermediate turbine. In one embodiment, the engine shaft 35 is the HP shaft 34. In another embodiment, the engine shaft 35 is the LP shaft 36. In yet another embodiment, the engine shaft 35 is an intermediate shaft.

The gearbox 47 is configured to receive mechanical energy from the engine shaft 35 and to transmit mechanical energy to a driveshaft 168 to operate the RBC 104. The driveshaft 168 is mechanically coupled to the gearbox 47, a compressor 110, and a turbine 112 of the RBC, and is rotatable with the RBC 104.

Referring still to the embodiment shown in FIG. 2, the RBC 104 is in an operably closed loop configuration, in which a working fluid 122 cycles from the compressor 110 through a first heat exchanger 106 then through the turbine 112 and through a second heat exchanger 107 and back into the compressor 110. In an operably closed loop configuration, the working fluid 122 is any compressible fluid, including, as a non-limiting example, carbon dioxide, oxygen, nitrogen, air, or mixtures thereof.

The working fluid 122 cycles through the compressor 110 and exits the compressor 110 as a high-pressure, high temperature (HP/HT) fluid 130. The HP/HT fluid 130 enters the first heat exchanger 106 and exits as a high-pressure, lower-temperature (HP/T1) fluid 131. The HP/T1 fluid 131 enters the turbine 112 and expands and exits as a low-pressure, low temperature (LP/T2) fluid 132. The LP/T2 fluid 132 enters a second heat exchanger 107 and exits as a low-pressure, lower-temperature (LP/T3) fluid 133. As the RBC 104 and working fluid 122 are in a closed loop configuration, the LP/T3 fluid 133 enters the compressor 110 and repeats the aforementioned cycle.

As a closed loop system is subject to leakage or losses, an operably closed loop system periodically "recharges" the RBC 104 with the working fluid 122. In one embodiment, recharging may also regulate working fluid 122 pressure and adjust the performance of the RBC 104 based on inputs from, and outputs to, a control system. In one embodiment of the closed loop configuration, in which the working fluid 122 is air, a bleed valve from the compressor section 21 of the engine 10 operates to provide compressed air 64 from the compressor section 21 of the engine 10 to the compressor 110. In other embodiments, in which the working fluid 122 is a compressible fluid other than air, the system is recharged from, as a non-limiting example, a source of carbon dioxide, nitrogen, or oxygen, rather than air 64 from the compressor section 21 of the engine 10.

In one embodiment, the heat exchangers 106, 107 of the RBC 104 are in thermal communication with a thermal management system (TMS) 108. The TMS 108 includes an environmental control system (ECS). The ECS generally includes dehumidifiers, water extractors, sensors, pressure and temperature regulators, pressurization and distribution systems, and air, in which the air is conditioned through the TMS 108 for use in an aircraft cabin, storage, avionics, and anti-icing systems. In other embodiments, the TMS 108 may further include thermal management of fuel, oil, hydraulic and pneumatic fluids, electronics and electrical systems, emergency systems, and thermal communication with propulsion unit and auxiliary power unit (APU) subsystems. Air for the TMS 108 may be outside atmospheric air or compressed air 64 from the compressor section 21 of the engine 10. Outside air ranges in temperature from those on the ground (e.g. up to about 60 C) to those temperatures at about 16200 meters altitude (e.g. about −58 C). The outside air is placed in thermal communication with the heat exchangers 106, 107 until the temperature is suitable for TMS 108 usage.

In one embodiment, the gearbox 47 is configured to output an operably constant rotational speed to the driveshaft 168 such that the RBC 104 operates at a constant rotational speed that is functionally independent of the rotational speed of the engine shaft 35. In other words, after the engine shaft 35 rotational speed is greater than a certain threshold, the driveshaft 168 rotational speed is different from the engine shaft 35 rotational speed regardless of the magnitude of or changes in rotational speed of the engine shaft 35.

However, in another embodiment, the gearbox 47 is configured to output a proportional rotational speed to the driveshaft 168 such that the RBC 104 operates at a fraction of the rotational speed of the engine shaft 35. For example, the driveshaft 168 rotational speed may be e.g. one-half, or one-third, or one-quarter, or one-sixth, or one-tenth, etc. of the rotational speed of the engine shaft 35.

In still another embodiment, the gearbox 47 may be configured to output a combination of a proportional rotational speed and an operably constant rotational speed to the driveshaft 168 relative to the rotational speed of the engine shaft 35. For example, the power output condition of the engine 10 may range, in increasing order of thrust output, from zero to ground idle (GIDLE), to flight idle (FIDLE), and to maximum take-off (MTO) condition, wherein MTO is taken as the maximum power output of an engine 10 and GIDLE is taken as the minimum power output of an engine 10. The rotational speeds of the driveshaft 168 and the engine shaft 35 are substantially the same or proportional from zero to GIDLE. From conditions GIDLE to MTO, the driveshaft 168 has a different and generally constant rotational speed from the engine shaft 35, independent of changes in engine shaft 35 rotational speed between GIDLE and MTO condition. Alternatively, in another embodiment, the rotational speeds of the driveshaft 168 and engine shaft 35 are substantially the same or proportional from zero to FIDLE. From conditions FIDLE to MTO, the driveshaft 168 has a different and generally constant rotational speed from the engine shaft 35, independent of changes in engine shaft 35 rotational speed between FIDLE and MTO condition. In yet another embodiment, between GIDLE and FIDLE, the driveshaft 168 rotational speed is generally constant at a first value and different from the engine shaft 35 rotational speed. Between FIDLE and MTO condition, the driveshaft 168 rotational speed is generally constant at a second value and different from the engine shaft 35 rotational speed.

In yet another embodiment, the gearbox 47 is configured to output a variable rotational speed to the driveshaft 168 relative to the rotational speed of the engine shaft 35. The gearbox 47 may include a controller and communications means to receive operating inputs, to communicate load requirements, and to command changes in rotational speed of the driveshaft 168. For example, where the engine 10 may operate at a constant rotational speed between FIDLE and MTO during aircraft cruise, the gearbox 47 may output varying rotational speeds to the driveshaft 168 depending on thermal load requirements for the TMS 108.

Referring still to the embodiment shown in FIG. 2, the gearbox 47 is mechanically coupled to an electrical powertrain 156 in parallel arrangement. The electrical powertrain 156 converts mechanical energy transmitted from the gearbox 47 into electrical energy to drive a propulsion device 170. In one embodiment, the propulsion device 170 is the fan section 14 of a turbofan engine 10. In another embodiment, the propulsion device 170 is a propeller of a turboprop or turboshaft engine. In yet other embodiments, the electrical powertrain 156 may further include power conditioners (e.g. rectifiers or transformers) and communications systems to distribute electrical energy to aircraft systems other than the propulsion device 170 e.g. avionics, lighting, emergency systems, hydraulic and pneumatic pumps, actuators, and sensors.

In other embodiments of the gearbox 47 in which the gearbox 47 transmits mechanical energy from the engine 10 to the RBC 104 and another system in parallel arrangement, the gearbox 47 may be configured to output different rotational speeds to the RBC 104 and the other system in parallel arrangement. For example, the gearbox 47 may be configured to output an operably constant rotational speed to the RBC 104 while the gearbox 47 is also configured to output a proportional rotational speed (relative to the engine shaft 35) to the electrical powertrain 156.

In one embodiment, the gearbox 47 is configured as the power gearbox 46, in which the power gearbox 46 is mechanically coupled to the LP shaft 36 and further configured to transmit mechanical energy to the RBC 104. In another embodiment, the gearbox 47 is configured as the AGB 45, in which the AGB 45 is mechanically coupled to the HP shaft 34 and further configured to transmit mechanical energy to the RBC 104. In yet another embodiment, the gearbox 47 is separate from either the AGB 45 or the power gearbox 46, in which the gearbox 47 is configured to transmit mechanical energy from the HP shaft 36, the LP shaft 34, or an intermediate shaft, to the RBC 104 by way of a driveshaft 168 that is mechanically coupled and rotatable to the RBC 104.

Figure 3:
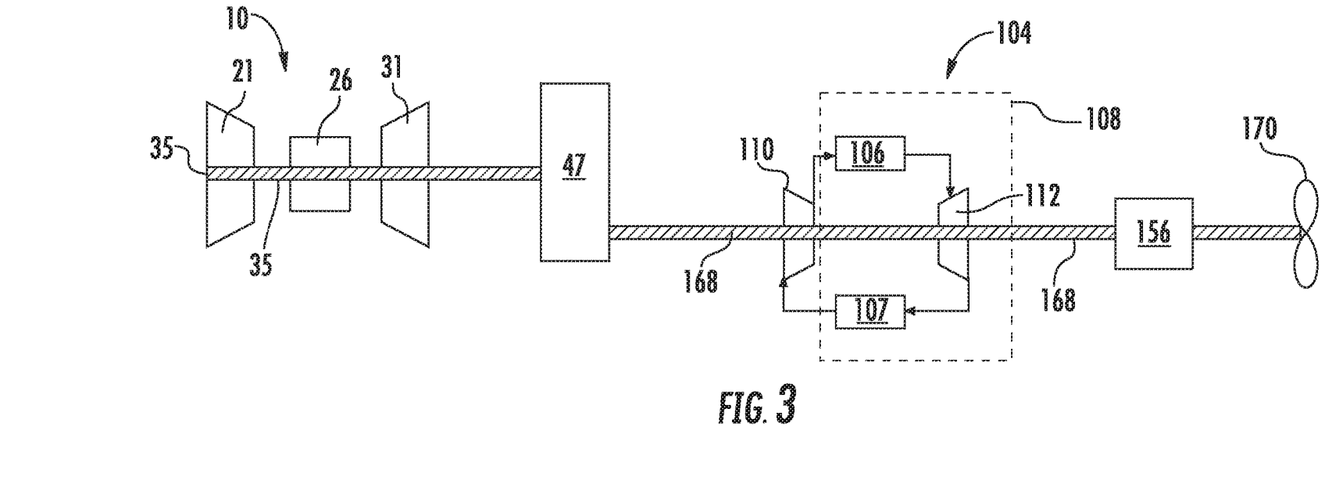
FIG. 3 is a schematic of another exemplary aircraft system including a gas turbine engine, a gearbox, a reverse Brayton cycle, an electrical powertrain, and a propulsion device.

FIG. 3 shows an embodiment in which the gearbox 47, the RBC 104, the electrical powertrain 156, and the propulsion device 170 are in serial arrangement. The driveshaft 168 is mechanically coupled and rotatable to the RBC 104 and transmits mechanical energy to the electrical powertrain 156. The electrical powertrain 156 is coupled to the propulsion device 170. The electrical powertrain 156 may be configured to output a rotational speed to the propulsion device 170 that is independent of the rotational speed of the driveshaft 168 or the engine shaft 35. As shown in FIG. 3, the TMS 108 may be configured in thermal communication with the electrical powertrain 156. The TMS 108 may be further configured to communicate RBC 104 output depending on thermal requirements for the electrical powertrain 156.

Figure 4:
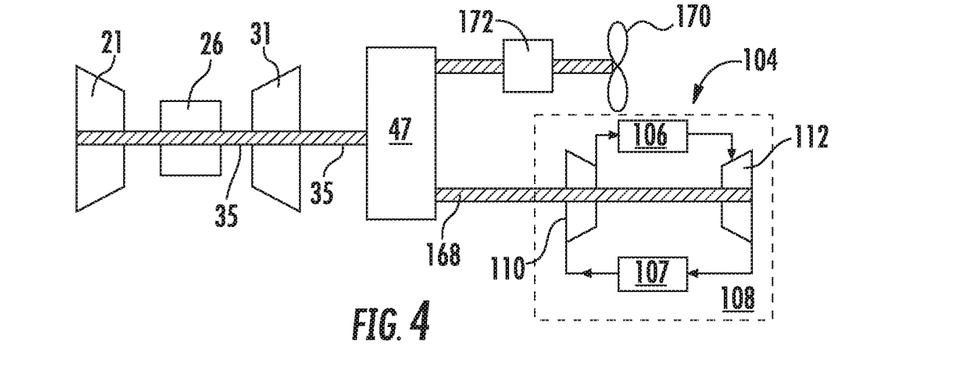
FIG. 4 is a schematic of an exemplary aircraft system including a gas turbine engine, a gearbox, a reverse Brayton cycle, a second gearbox, and a propulsion device.
Figure 5:
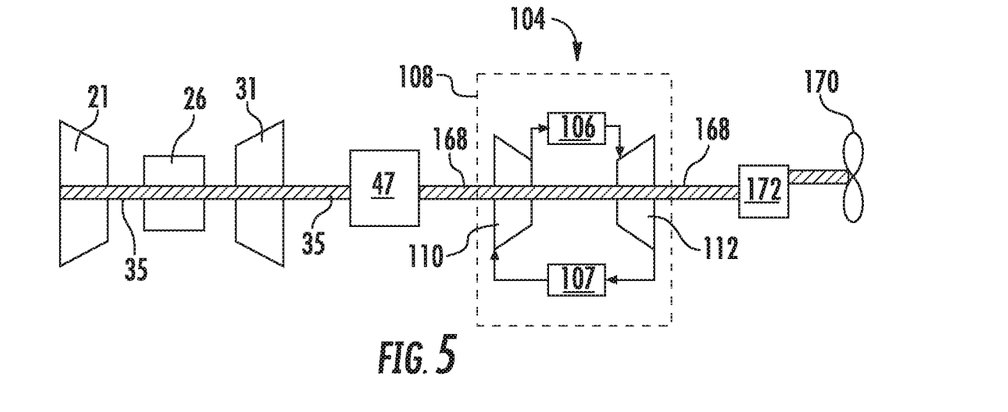
FIG. 5 is a schematic of another exemplary aircraft system including a gas turbine engine, a gearbox, a reverse Brayton cycle, a second gearbox, and a propulsion device.

FIG. 4 and FIG. 5 each show embodiments in which the propulsion device 170 is mechanically driven by a second gearbox 172 in parallel arrangement or serial arrangement, respectively. The second gearbox 172 is configured to receive mechanical energy from the gearbox 47. Similarly to the gearbox 47, the second gearbox 172 may be configured to output to the propulsion device 170 the same rotational speed as the engine shaft 35, or a proportional rotational speed to the engine shaft 35, or an operably constant drive speed, or a variable drive speed, or a combination thereof.

Figure 6:
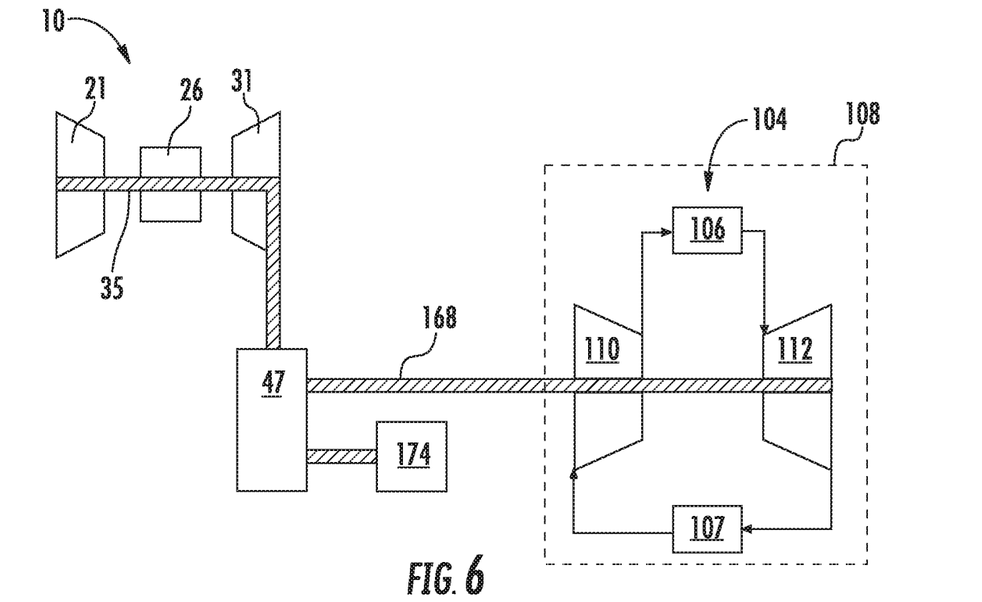
FIG. 6 is a schematic of an exemplary aircraft system including a gas turbine engine, a gearbox, a reverse Brayton cycle, and a gear driven system.

FIG. 6 shows an embodiment in which the gearbox 47 transmits mechanical energy from the engine 10 to a gear driven system 174 in parallel arrangement to the driveshaft 168 and RBC 104. The gear driven system 174 may include, for example, auxiliary equipment, such as, but not limited to, hydraulic pumps, pneumatic pumps, or heat exchangers.

Figure 7:
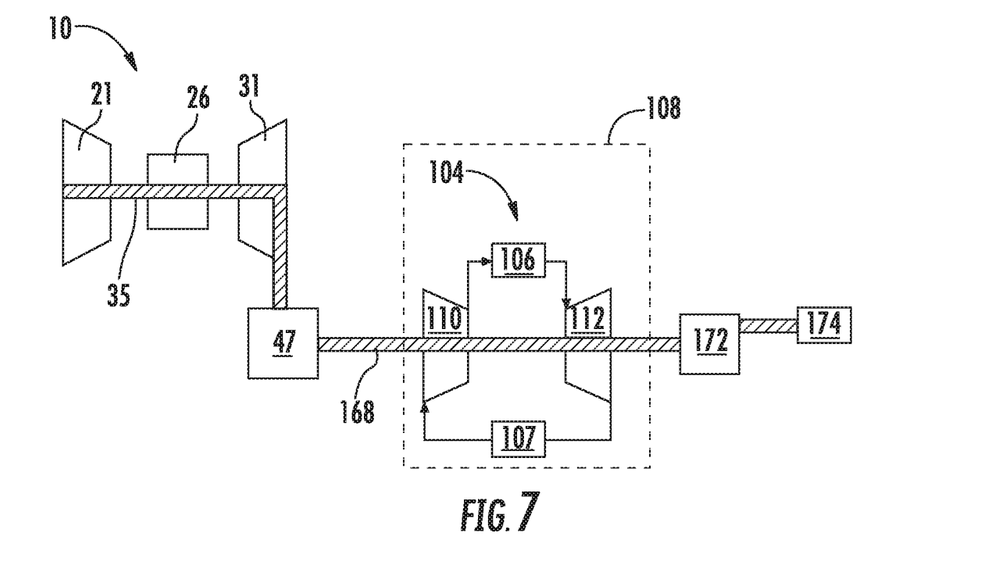
FIG. 7 is a schematic of an exemplary aircraft system including a gas turbine engine, a gearbox, a reverse Brayton cycle, a second gearbox, and a gear driven system.

FIG. 7 shows an embodiment in which the gear driven system 174 is in serial arrangement with the gearbox 47, the RBC 104, and the second gearbox 172. The gearbox 47 transmits mechanical energy from the engine 10 to the driveshaft 168, in which the driveshaft 168 is mechanically coupled to the RBC 104 and the second gearbox 172. Similarly to the gearbox 47, the second gearbox 172 may output to the gear driven system 174 the same rotational speed as the driveshaft 168 or engine shaft 35, or output a proportional rotational speed, or a constant drive speed, or a combination thereof. In another embodiment, the second gearbox 172 is the AGB 45.

Figure 8:
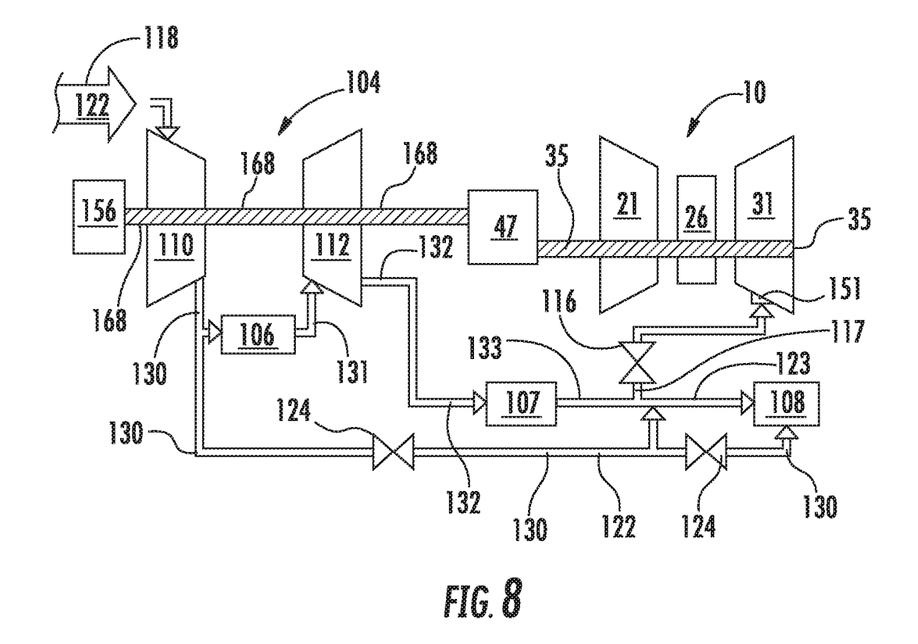
FIG. 8 is a schematic of an exemplary aircraft system including a gas turbine engine, a reverse Brayton cycle, and an environmental control system.

FIG. 8 shows a schematic of an embodiment that includes the gas turbine engine 10 and the RBC 104, in which the RBC 104 is in an open loop configuration and in fluid communication with the TMS 108. In an open loop configuration, the working fluid 122 in the RCB 104 is outside air 118. The outside air 118 is received through one or several plenums in an aircraft from atmospheric conditions while the aircraft is either at altitude or on the ground. More specifically, "at altitude" refers to all altitudes other than on the ground, such as, for example, once the aircraft has taken-off.

In the embodiment shown in FIG. 8, the working fluid 122 enters the compressor 110 and is compressed to a high-pressure, high-temperature (HP/HT) fluid 130. The HP/HT fluid 130 enters a first heat exchanger 106 and becomes a high-pressure, lower-temperature (HP/T1) fluid 131. The HP/T1 fluid 131 enters the turbine 112 where the fluid 131 expands, thereby lowering pressure and temperature, and becomes a low-pressure, low temperature (LP/T2) fluid 132. The LP/T2 fluid 132 enters a second heat exchanger 107 and exits as a low-pressure, lower-temperature (LP/T3) fluid 133. The HP/HT fluid 130 may, in part, route to and mix with the LP/T3 fluid 133. The LP/T3 fluid 133 or its mixture with the HP/HT fluid 130 is regulated by a control valve 124. The LP/T3 fluid 133 or its mixture with the HP/HT fluid 130 routes to the TMS 108 as ECS air 123. Additionally, the HP/HT fluid 130 exiting the compressor 110 may, in part, route to other systems of the TMS 108, such as, but not limited to, an aircraft wing anti-icing system or a nacelle anti-ice system.

In other embodiments, the second heat exchanger 107 may be excluded and only the single heat exchanger 106 is employed, depending on heat exchanger performance and specific system requirements relative to aircraft size and type. In yet other embodiments, the ECS air 123 is a mixture of LP/LT fluid 133 and HP/T1 fluid 131. Additionally, other embodiments exclude the second heat exchanger 107 and the LP/T2 fluid 132 is the ECS air 123 or mixes with the HP/HT fluid 130 or HP/T1 fluid 131.

As shown in FIG. 8, a portion of working fluid 117 from the RBC working fluid 122 may be directed to the turbine section 31 of the engine 10 as cooling air for an active clearance control (ACC) system 151. The portion of working fluid 117 going to the ACC 151 is regulated by an ACC valve 116. The portion of working fluid 117 in the ACC 151 onto the turbine cases reduces the radial distance between the turbine cases and turbine blades during engine operation. Combustion gases 66 that pass in the area between the blade tip and the case do not substantially drive the turbine blades. Therefore, the radial gap between the turbine cases and the turbine blades is a source of engine inefficiency.

As the engine operates and increases in power, a combination of factors contribute to changes in the radial distance (direction R in FIG. 1) between the turbine blade tips and the surrounding turbine case during engine operation. These factors include, but are not limited to, the centrifugal force of the turbine blades and disks, the effect of hot combustion gases 66 radially expanding the turbine blades and disks, and the pressure changes due to the combustion gases 66 acting on the turbine cases. An ACC 151 operates by directing a cooler fluid from the compressor 110 into thermal communication with the hot outer casing 18 at the turbine section 31, thereby causing the hot outer casing 18 at the turbine section 31 to contract toward the turbine blades and reduce the radial area between the blades and the cases.

The present disclosure may increase gas turbine engine and aircraft efficiency by providing cooling capability without extracting bleed air from the engine 10, and therefore avoiding inefficiencies due to interruptions in the thermodynamic cycle of the engine 10. Additionally, the present disclosure avoids inefficiencies due to power conversion losses due to converting mechanical energy to electrical energy, back to mechanical energy to drive a mechanical system (e.g. a reverse Brayton cycle system).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft power generation system, comprising:
   a gas turbine engine including a compressor section, a turbine section, and an engine shaft, the compressor section arranged in serial flow arrangement with the turbine section, and the engine shaft rotatable with at least a portion of the compressor section and with at least a portion of the turbine section;

a reverse Brayton cycle system including a compressor, a first driveshaft, a turbine, and a first heat exchanger, the first driveshaft mechanically coupled with the compressor and the turbine, and the compressor, the first heat exchanger, and the turbine in serial flow arrangement;

a gearbox configured to receive mechanical energy from the engine shaft and transmit the mechanical energy to the reverse Brayton cycle system through the first driveshaft mechanically coupled with the compressor and the turbine downstream of the gearbox and to an electrical powertrain through a second driveshaft each separately coupled to the gearbox in a parallel arrangement, wherein the gearbox is configured to output different rotational speeds to the first and second driveshafts;

a thermal management system, wherein the gearbox outputs varies the rotational speed to the first driveshaft based on thermal load requirements of the thermal management system; and a propulsion device, wherein the propulsion device is coupled to the electrical powertrain in serial arrangement, wherein the reverse Brayton cycle system further comprises a second heat exchanger, and wherein the compressor, the first heat exchanger, the turbine, and the second heat exchanger are in an operatively closed loop arrangement, and wherein the thermal management system comprises at least the first heat exchanger.

2. The aircraft power generation system in claim 1, further comprising:

a working fluid, wherein the working fluid is in the reverse Brayton cycle system, and wherein the working fluid is in fluid communication with the thermal management system.

3. The aircraft power generation system in claim 2, wherein the thermal management system further comprises an environmental control system, and wherein the environmental control system is in fluid communication with the reverse Brayton cycle system.

4. The aircraft power generation system in claim 1, wherein the reverse Brayton cycle system further comprises a working fluid, and wherein the working fluid is a compressible fluid.

5. An aircraft power generation system, comprising:

a gas turbine engine including a compressor section, a turbine section, and an engine shaft, the compressor section arranged in serial flow arrangement with the turbine section, and the engine shaft rotatable with at least a portion of the compressor section and with at least a portion of the turbine section;

a reverse Brayton cycle system including a compressor, a first driveshaft, a turbine, and a first heat exchanger, wherein the first driveshaft is mechanically coupled with the compressor and the turbine; and a gearbox configured to receive mechanical energy from the engine shaft and transmit the mechanical energy to the reverse Brayton cycle system through the first driveshaft and to an electrical powertrain through a second driveshaft each separately coupled to the gearbox in a parallel arrangement, the electrical powertrain further coupled to a fan section in serial flow arrangement with the compressor section of the gas turbine engine, wherein the first driveshaft is configured to output a proportional rotational speed relative to a rotational speed of the engine shaft when the gas turbine engine operates at a first power output condition and an operably constant rotational speed irrespective of the rotational speed of the engine shaft when the gas turbine engine operates at a second power output condition, the second power output condition having a greater thrust output than the first power output condition; and a propulsion device of the fan section, wherein the propulsion device is coupled to the electrical powertrain in serial arrangement, and wherein the reverse Brayton cycle system further comprises a second heat exchanger, and wherein the compressor, the first heat exchanger, the turbine, and the second heat exchanger are in an operatively closed loop arrangement.

6. The aircraft power generation system in claim 5, wherein the first driveshaft is configured to rotate at a first rotational speed and the second driveshaft is configured to rotate at a second rotational speed different from that of the first rotational speed.

7. An aircraft power generation system, comprising:

a gas turbine engine including a compressor section, a turbine section, and an engine shaft, the compressor section arranged in serial flow arrangement with the turbine section, and the engine shaft rotatable with at least a portion of the compressor section and with at least a portion of the turbine section;

a reverse Brayton cycle system including a compressor, a first driveshaft, a turbine, and a first heat exchanger, the first driveshaft mechanically coupled with the compressor and the turbine; and a gearbox configured to receive mechanical energy from the engine shaft and transmit the mechanical energy to the reverse Brayton cycle system through the first driveshaft, wherein the compressor and the turbine of the reverse Brayton cycle system are each positioned downstream of the gearbox, the gearbox mechanically linked to the reverse Brayton cycle system, wherein a first driveshaft rotational speed is substantially equal or proportional to a rotational speed of the engine shaft when a power output condition of the gas turbine engine is less than a ground idle thrust output and is different from the rotational speed of the engine shaft regardless of changes in the rotational speed of the engine shaft when the power output condition of the gas turbine engine is greater than the ground idle thrust output;

an electrical powertrain coupled to the gearbox through a second driveshaft separately coupled to the gearbox from the first driveshaft in a parallel arrangement; and a propulsion device, wherein the propulsion device is coupled to the electrical powertrain in serial arrangement, and wherein the reverse Brayton cycle system further comprises a second heat exchanger, and wherein the compressor, the first heat exchanger, the turbine, and the second heat exchanger are in an operatively closed loop arrangement.

* * * * *